United States Patent
Baker et al.

(10) Patent No.: US 10,434,923 B2
(45) Date of Patent: Oct. 8, 2019

(54) TRAILER CONVEYER SYSTEM

(71) Applicant: WABASH NATIONAL, L.P., Lafayette, IN (US)

(72) Inventors: Leonard W. Baker, Lafayette, IN (US); James Brown, Crystal Lake, IL (US); Dan Gilbert, Monticello, IN (US); John Kauffman, Battleground, IN (US)

(73) Assignee: Wabash National, L.P., Lafayette, IN (US)

(*) Notice: Subject to any disclaimer, the term of this patent is extended or adjusted under 35 U.S.C. 154(b) by 0 days.

(21) Appl. No.: 15/279,802

(22) Filed: Sep. 29, 2016

(65) Prior Publication Data

US 2017/0088031 A1 Mar. 30, 2017

Related U.S. Application Data

(60) Provisional application No. 62/234,959, filed on Sep. 30, 2015.

(51) Int. Cl.
| | |
|---|---|
| *B60P 1/52* | (2006.01) |
| *E05D 5/02* | (2006.01) |
| *B65G 21/00* | (2006.01) |
| *E05D 11/08* | (2006.01) |
| *E05D 5/04* | (2006.01) |
| *B60P 1/36* | (2006.01) |

(52) U.S. Cl.
CPC ............ *B60P 1/52* (2013.01); *B65G 21/00* (2013.01); *E05D 5/0207* (2013.01); *E05D 5/043* (2013.01); *E05D 11/082* (2013.01); *B60P 1/36* (2013.01); *Y10T 16/593* (2015.01)

(58) Field of Classification Search
CPC ......... B60P 1/52; Y10T 16/593; B62D 33/08; B65G 21/00; E05D 5/0207; E05D 5/043; E05D 11/082
USPC ........... 198/860.1, 860.2; 414/529, 532–534, 414/679; 16/281; 105/372, 375
See application file for complete search history.

(56) References Cited

U.S. PATENT DOCUMENTS

| | | | | |
|---|---|---|---|---|
| 2,077,649 A | * | 4/1937 | Sweeley | B61D 45/006 105/372 |
| 3,561,622 A | | 2/1971 | Dioguardi et al. | |
| 3,875,871 A | * | 4/1975 | Thornton | B61D 3/04 105/375 |
| 4,002,008 A | * | 1/1977 | Grasson | B65B 15/00 100/153 |
| 4,664,583 A | | 5/1987 | Gust | |
| 5,361,481 A | * | 11/1994 | Lloyd | B65G 1/0407 29/407.01 |

(Continued)

OTHER PUBLICATIONS

Cisco-Eagle [online]; Copyright 2017 Cisco-Eagle; Delivery Truck Folding Conveyor specification sheet; <http://www.cisco-eagle.com/catalog/c-1874-delivery-truck-folding-conveyor.aspx>.

*Primary Examiner* — James Keenan
(74) *Attorney, Agent, or Firm* — Quarles & Brady LLP

(57) ABSTRACT

A conveyor system for loading a trailer is disclosed. The conveyor system includes a support frame adapted to couple to a floor of a trailer, a conveyance mechanism coupled to the support frame and configured to extend from a rear of the trailer toward a front of the trailer, and a conveyor rail arranged to extend between and interconnect the support frame and the conveyance mechanism.

18 Claims, 14 Drawing Sheets

(56) References Cited

U.S. PATENT DOCUMENTS

| | | | | |
|---|---|---|---|---|
| 6,109,579 | A * | 8/2000 | Huang | B60P 7/0807 |
| | | | | 248/294.1 |
| 6,200,082 | B1 | 3/2001 | Molenaar et al. | |
| 6,588,624 | B1 * | 7/2003 | Connors | E05D 7/12 |
| | | | | 16/341 |
| 6,612,426 | B1 * | 9/2003 | Guerra | B65G 21/06 |
| | | | | 198/841 |
| 7,114,615 | B1 * | 10/2006 | Karpy | B65G 21/20 |
| | | | | 198/860.1 |
| 7,178,665 | B2 * | 2/2007 | Ryan | B65G 15/00 |
| | | | | 198/836.1 |
| 7,293,813 | B2 * | 11/2007 | Squyres | B60P 1/00 |
| | | | | 105/372 |
| 7,753,194 | B1 * | 7/2010 | Jager | B65G 15/62 |
| | | | | 198/841 |
| 8,051,976 | B2 * | 11/2011 | Koeda | B65G 21/06 |
| | | | | 198/837 |
| 8,894,122 | B2 * | 11/2014 | Gilbert | B62D 25/2054 |
| | | | | 296/24.44 |
| 9,702,175 | B2 * | 7/2017 | Jaworski | B60P 1/00 |
| 2002/0060145 | A1 * | 5/2002 | Doerfer | B65G 37/02 |
| | | | | 198/860.2 |
| 2003/0172497 | A1 * | 9/2003 | Cha | E05D 11/082 |
| | | | | 16/342 |
| 2007/0006422 | A1 * | 1/2007 | Lu | G06F 1/1601 |
| | | | | 16/337 |
| 2014/0158653 | A1 * | 6/2014 | Evans | B62D 33/046 |
| | | | | 211/90.02 |

* cited by examiner

TRAILER CONVEYER SYSTEM

CROSS-REFERENCE TO RELATED APPLICATIONS

The present invention claims the benefit of U.S. Provisional Application No. 62/234,959, filed Sep. 30, 2016, and entitled "Trailer Conveyor System." The disclosure of such provisional application is hereby incorporated by reference herein in its entirety.

FIELD OF THE DISCLOSURE

The present disclosure relates generally to conveyor trailers, and more specifically to conveyor systems for loading and unloading conveyor trailers.

BACKGROUND

A conveyor system can be included in a trailer to generally provide assistance during loading and unloading of the cargo from the trailer. During loading of the trailer, cargo can be placed on the conveyor system at the rear of the trailer and quickly travel a desired distance to reach a location where the cargo can be removed from the conveyor and secured for transport. During unloading of the trailer, cargo can be placed on the conveyor system and quickly travel to the rear of the trailer to be removed from the trailer. Conveyor systems are designed to handle a variety of cargo and can incur damages during the loading and unloading processes. As such, improving the durability and usability of the conveyor systems is desired.

SUMMARY

The present disclosure may comprise one or more of the following features and combinations thereof.

A conveyor system for loading a trailer may include a support frame adapted to couple to a floor of a trailer, a conveyance mechanism coupled to the support frame and configured to extend from a rear of the trailer toward a front of the trailer, and a conveyor rail arranged to extend between and interconnect the support frame and the conveyance mechanism. The conveyor system may further include t least one load deck panel configured to be hingedly connected to a wall of the trailer and having a closed position in which the load deck panel is adjacent the wall and an open position in which the load deck panel is adjacent the conveyor rail, the load deck panel including a hinge assembly, the hinge assembly including a hinge butt portion configured to be coupled to the wall of the trailer, a hinge strap portion configured to be coupled to a bottom surface of the load deck panel, a spring extending along a pivot axis and positioned below the bottom surface of the load deck panel, and a hinge pin extending through the torsion spring and coupling the hinge butt portion and the hinge strap portion wherein the torsion spring is configured to assist in hinged movement of the load deck panel about the pivot axis between an open position and a closed position. The support frame may include a rear leg positioned at a first end of the conveyance mechanism including first and second leg towers spaced from one another and a support member connecting the first and second leg towers, wherein the first and second leg towers are configured to be attached to the floor of the trailer and the support member is coupled to the conveyor rail. The support frame further may include at least one belly leg including a single belly leg tower having a first end configured to be attached to the floor of the trailer and a bracket connected to a second end of the belly leg tower, wherein the bracket is coupled to the conveyor rail.

In some embodiments, the spring is a torsion spring that is wound around a portion of the hinge pin outside of the hinge butt portion.

In some embodiments, the spring has a first end and a second end, the first end extends away from the hinge pin into contact the load deck panel, and the second end extends away from the hinge pin into contact with a wall of the trailer and the spring hinge further has a spring constant that selectively allows movement of the load deck panel between the open and closed positions.

In some embodiments, the conveyor system includes an upper coupler leg spaced from a second end of the conveyance mechanism opposite the first end, the upper coupler leg including first and second legs having first ends configured to be attached to the floor of the trailer and a brace connecting second ends of the first and second legs, wherein the brace is coupled to the conveyor rail.

In some embodiments, the support frame further includes a second belly leg including a single belly leg tower having a first end configured to be attached to the floor of the trailer and a bracket connected to a second end of the second belly leg, wherein the bracket is coupled to the conveyor rail.

In some embodiments, the conveyor system includes an upper coupler leg positioned at a second end of the conveyance mechanism opposite the first end, the upper coupler leg including first and second legs having first ends configured to be attached to the floor of the trailer and a brace connecting second ends of the first and second legs, wherein the brace is coupled to the conveyor rail, wherein a first distance between the rear tower leg and first belly leg, a second distance between the first and second belly legs, and third distance between the second belly leg and the upper coupler leg are equal.

In some embodiments, the support frame includes a table leg including a single table tower having a first end configured to be attached to the floor of the trailer and a bracket connected to a second end of the table leg, wherein the bracket is coupled to the conveyor rail.

In some embodiments, the table leg is positioned between the second end of the conveyance mechanism and the upper coupler leg.

In some embodiments, the support member of the rear leg comprises a rear leg tower brace having first and second opposing side with the first side coupled to the first and second leg towers, wherein a longitudinal extent of the rear leg tower brace is perpendicular to the first and second leg towers and a channel support coupled to the second side of the rear leg tower brace, the channel support coupling the rear leg to the conveyor rail.

A conveyor system for loading a trailer comprising a spring hinge for a load deck panel is disclosed. The spring hinge may comprise a hinge butt portion configured to be coupled to a wall of a trailer, a hinge strap portion configured to be coupled to a bottom surface of the load deck panel, and a spring extending along a pivot axis and configured to be positioned below a bottom surface of the load deck panel. The spring hinge may further include a hinge pin extending through the spring and coupling the hinge butt portion and the hinge strap portion. The spring may be configured to assist in hinged movement of the load deck panel about the pivot axis between a closed position in which the load deck panel is substantially vertical and an open position in which the load deck panel is substantially horizontal.

In some embodiments, the spring is a torsion spring that is wound around a portion of the hinge pin outside of the hinge butt portion.

In some embodiments, the spring has a first end and a second end, the first end extends away from the hinge pin into contact the load deck panel, and the second end extends away from the hinge pin into contact with a wall of the trailer.

In some embodiments, the spring has a spring constant, the spring constant of the spring generates a torsional force that is translated into a linear force at first and second ends of the spring to retain the load deck panel in a vertical position when desired, but also retain the load deck panel in a horizontal position when desired.

A conveyor system for loading a trailer may comprise a support frame adapted to couple to a floor of a trailer, a conveyance mechanism coupled to the support frame and configured to extend from a rear of the trailer toward a front of the trailer, and a conveyor rail arranged to extend between and interconnect the support frame and the conveyance mechanism. The support frame may include a rear leg positioned at a first end of the conveyance mechanism including first and second leg towers spaced from one another and a support member connecting the first and second leg towers, wherein the first and second leg towers are configured to be attached to the floor of the trailer and the support member is coupled to the conveyor rail. The support frame may include at least one belly leg including a single belly leg tower having a first end configured to be attached to the floor of the trailer and a bracket connected to a second end of the belly leg tower, wherein the bracket is coupled to the conveyor rail.

In some embodiments, the conveyor system includes an upper coupler leg spaced from a second end of the conveyance mechanism opposite the first end, the upper coupler leg including first and second legs having first ends configured to be attached to the floor of the trailer and a brace connecting second ends of the first and second legs, wherein the brace is coupled to the conveyor rail.

In some embodiments, the support frame comprises a second belly leg including a single belly leg tower having a first end configured to be attached to the floor of the trailer and a bracket connected to a second end of the second belly leg, wherein the bracket is coupled to the conveyor rail.

In some embodiments, the conveyor system comprises an upper coupler leg positioned at a second end of the conveyance mechanism opposite the first end, the upper coupler leg including first and second legs having first ends configured to be attached to the floor of the trailer and a brace connecting second ends of the first and second legs, wherein the brace is coupled to the conveyor rail, wherein a first distance between the rear tower leg and first belly leg, a second distance between the first and second belly legs, and third distance between the second belly leg and the upper coupler leg are equal.

In some embodiments, the support frame comprises a table leg including a single table tower having a first end configured to be attached to the floor of the trailer and a bracket connected to a second end of the table leg, wherein the bracket is coupled to the conveyor rail.

In some embodiments, the table leg is positioned between the second end of the conveyance mechanism and the upper coupler leg.

In some embodiments, the support member of the rear leg comprises a rear leg tower brace having first and second opposing side with the first side coupled to the first and second leg towers, wherein a longitudinal extent of the rear leg tower brace is perpendicular to the first and second leg towers and a channel support coupled to the second side of the rear leg tower brace, the channel support coupling the rear leg to the conveyor rail.

These and other features of the present disclosure will become more apparent from the following description of the illustrative embodiments.

DETAILED DESCRIPTION OF THE DRAWINGS

Figure 1:
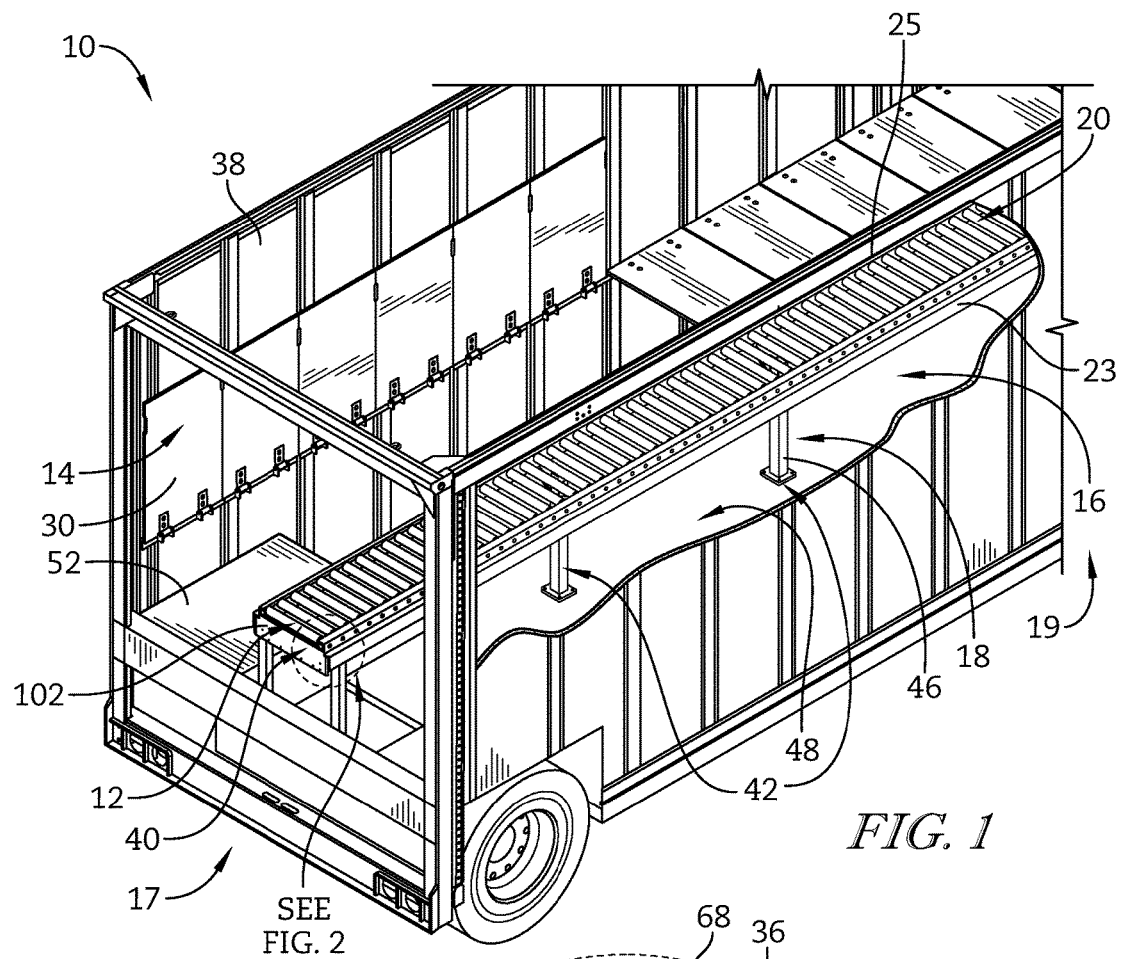
FIG. 1 is a perspective view of a conveyor trailer depicting a conveyor system for loading a conveyor trailer.

For the purposes of promoting an understanding of the principles of the disclosure, reference will now be made to a number of illustrative embodiments illustrated in the drawings and specific language will be used to describe the same. While the concepts of this disclosure are described in relation to a conveyor trailer for a tractor, it will be understood that that they are equally applicable to other trailers generally, and more specifically to drop-deck trailers, pup trailers, conventional flat-bed and/or box or van type trailers, examples of which include, but should not be limited to, straight truck bodies, small personal and/or commercial trailers, and the like.

A conveyor trailer 10 can be loaded and unloaded using a conveyor system 12, as shown in FIG. 1. The conveyor trailer 10 may comprise the conveyor system 12, a load deck system 14, and a floor 16, as shown in FIG. 1. The conveyor system 12 is mounted to the floor 16 and is used to load and unload cargo into and out of the conveyor trailer 10. In illustrative embodiments, the conveyor system 12 is comprised of steel, although any suitable metal, metal alloy, or polymeric material suitable for the conveyor system 12 can be used.

Figure 2:
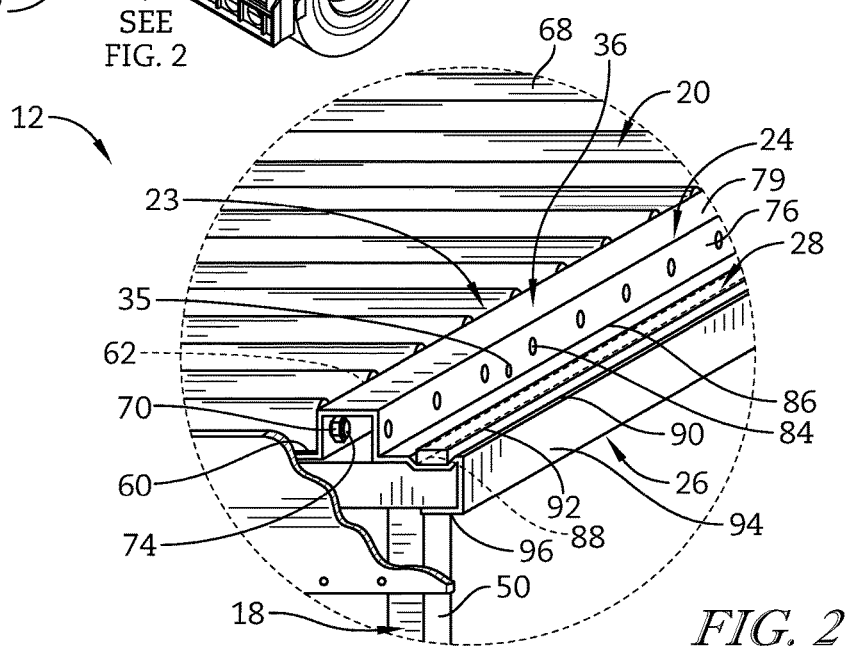
FIG. 2 is a detailed view of a portion of the conveyor system of FIG. 1.

The conveyor system 12 includes a support frame 18, a set of rollers 20, and a conveyor rail 22, as shown in FIGS. 1 and 2. The support frame 18 is adapted to couple the conveyor system 12 to the floor 16 of the conveyor trailer 10, and support the set of rollers 20 and the conveyor rail 22. The set of rollers 20 improves the efficiency of transporting cargo from the rear 17 of the trailer towards the front 19 of the trailer so the cargo can be quickly secured. Illustratively, the cargo can be secured using the load deck system 14. The conveyor rail 22 extends between and interconnects the set of rollers 20 to the support frame 18, as shown in FIGS. 1 and 2.

Figure 3:
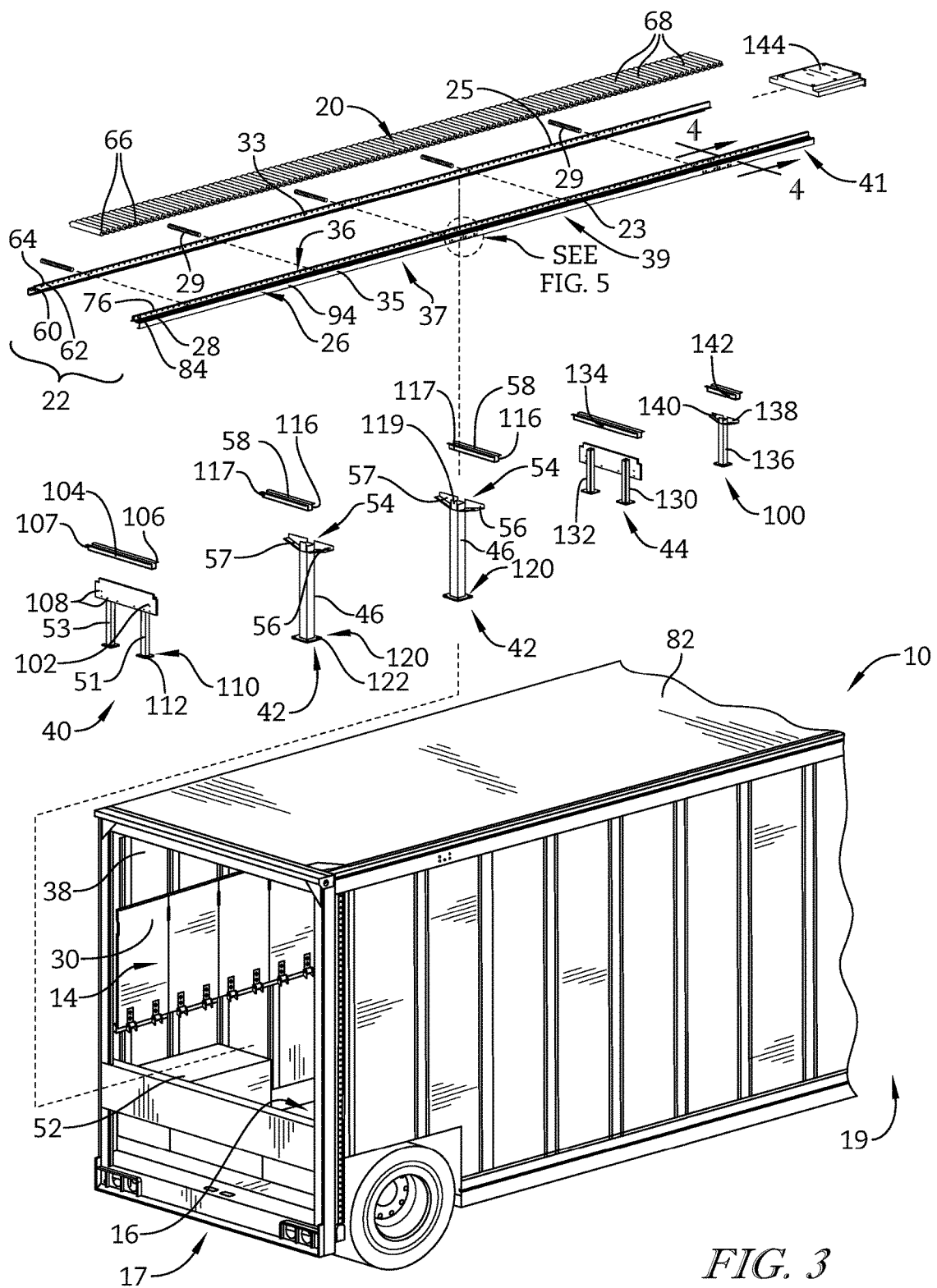
FIG. 3 is an exploded assembly view of the conveyor trailer, the conveyor system for loading the conveyor trailer, and the support frame and conveyor rails of the conveyor system of FIG. 1.

The conveyor rails includes first and second conveyor rails 23, 25. While the conveyor rail 23 will be discussed in detail, the conveyor rail 25 is identical to the conveyor rail 23. The conveyor rail 23 includes a roller support 24, a frame mount 26, and a load deck support 28 that is arranged to extend between and interconnect the roller support 24 and frame mount 26, as shown in FIGS. 2 and 3. The frame mount 26 couples the conveyor rail 23 to the support frame 18. The load deck support 28 is configured to receive a bumper 92 and supports the load deck panels 30 when the load deck panels 30 are in the horizontal load position. The roller support 24 couples the set of rollers 20 to the conveyor rail 23. The roller support 24 further includes a roller guard 36 that protects the set of rollers 20 from an external force during loading or unloading of the conveyor trailer 10.

The conveyor trailer 10 includes a load deck system 14 attached to the walls 38 of the conveyor trailer 10, as shown in FIG. 1. The load deck system 14 includes a plurality of load deck panels 30 hingedly attached to the walls 38. The load deck panels 30 can be vertically oriented or can rotate to a horizontal position to support cargo in the conveyor trailer 10. When the load deck panels 30 are in their horizontal configuration, they extend inwardly from the walls 38 and rest on the bumper 92 of the load deck support 28 of the conveyor system 12. Users can transfer cargo from the rear 17 of the trailer down the conveyor system 12 to efficiently load cargo on the floor 16, and the horizontally oriented load deck panels 30. The load deck system 14 may be similar to the load deck system of U.S. Pat. No. 8,894,122, the disclosure of which is hereby incorporated by reference herein in its entirety.

Figure 6:
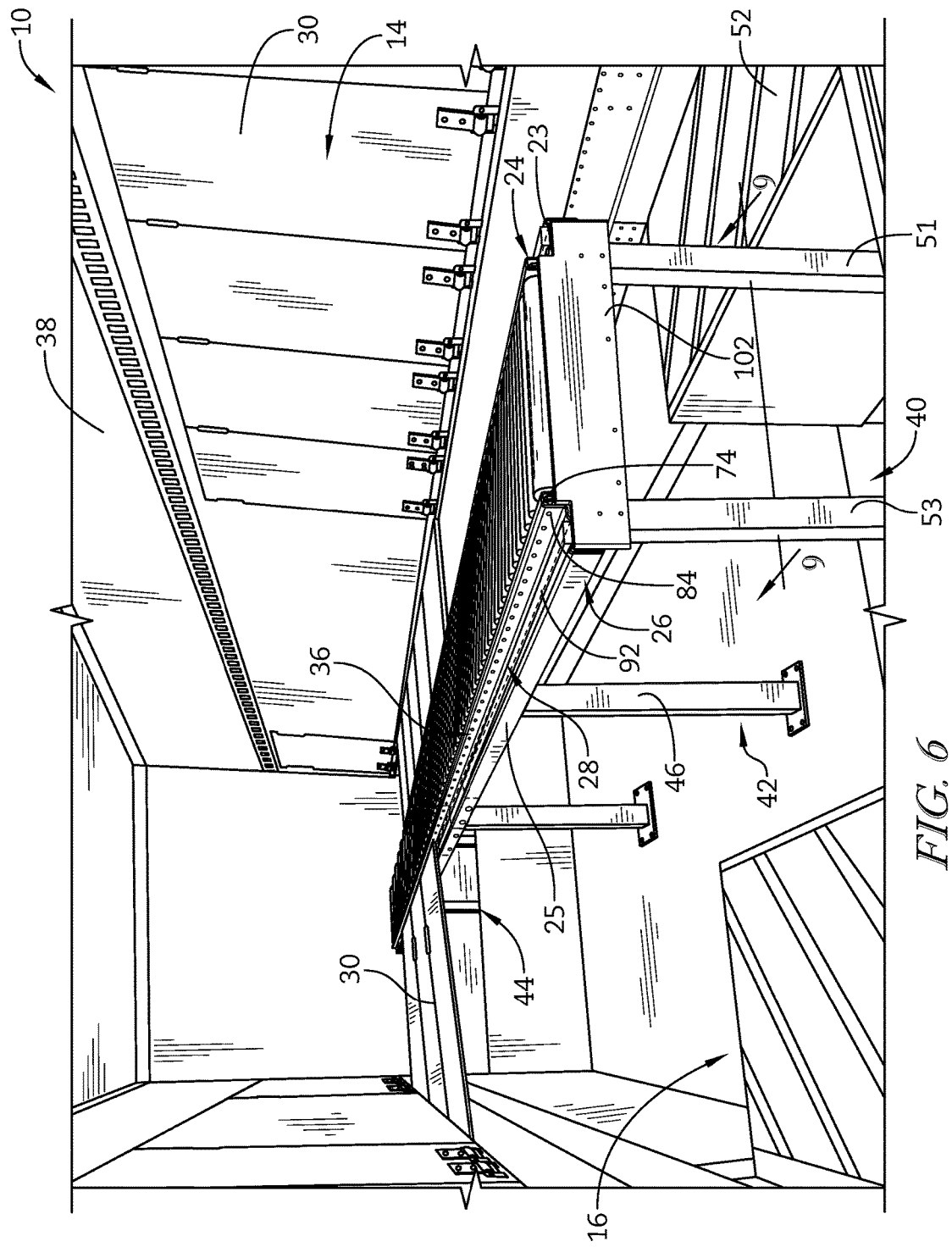
FIG. 6 is a perspective view of the conveyor system of FIG. 1 depicting the conveyor rails supporting load deck panels.
Figure 8:
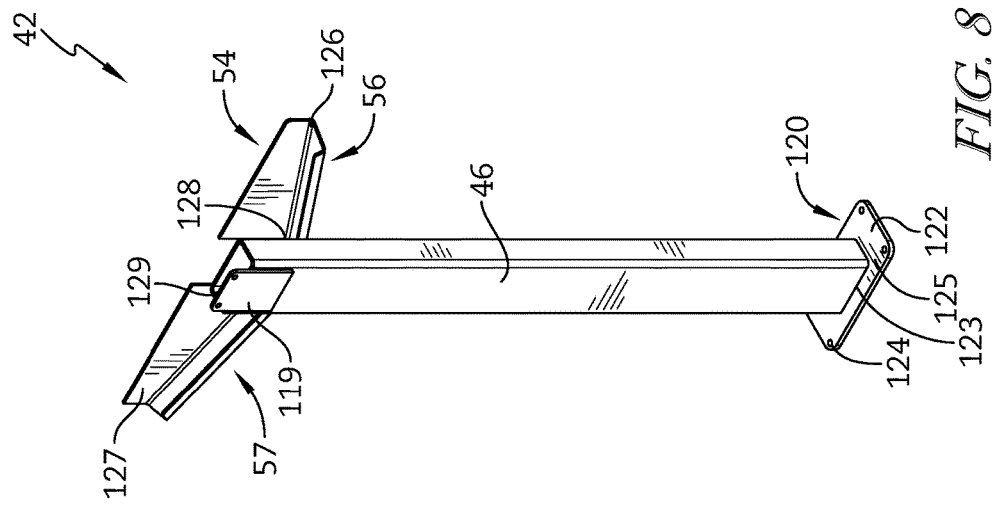
FIG. 8 is a perspective view of a belly leg of the conveyor system of FIG. 1.

The conveyor system 12 is coupled to the floor 16 by the support frame 18 as shown in FIGS. 1 and 6. The support frame 18 includes a rear leg 40, at least one belly leg 42, and an upper coupler leg 44 as shown in FIG. 3. The rear leg 40 includes two towers 50 that are located at the rear 17 of the trailer between the wheel wells 52. The belly leg 42 includes a single belly tower 46 to maximize the packing space on the floor 16 in the belly 48 of the conveyor trailer 10, as shown in FIG. 8. The belly leg 42 includes a gusset bracket 54 arranged to extend between and interconnect the conveyor rail 22 to the support frame 18. The gusset bracket 54 includes a first arm 56 and a second arm 57 that extend outwardly from the belly leg 42 and a channel support 58 that couples to the conveyor rails 22.

Figure 5:
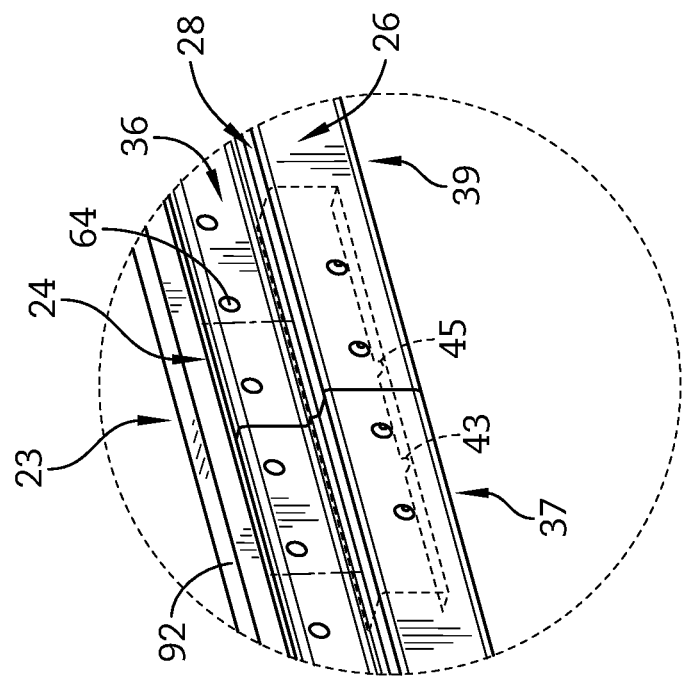
FIG. 5 is a detailed view of a portion of the conveyor rail of the conveyor system of FIG. 1.

The conveyor rail 23 includes a rear segment 37, a middle segment 39, and a front segment 41, as shown in FIG. 3. The middle segment 39 extends between and interconnects the rear segment 37 and the front segment 41. The rear segment 37 is coupled to the middle segment 39 with a splice bracket 43 and the middle segment 39 is coupled to the front segment 41 with a splice bracket 43, as shown in FIG. 5. Splice bracket 43 includes four apertures 45 configured to couple with the conveyor rail 22.

The conveyor rail 23 includes a roller support 24 coupled to the frame mount 26 of the conveyor rail 23, and a support rod 29, as shown in FIGS. 2 and 3. The support rod 29 spans between the first conveyor rail 23 and the second conveyor rail 25 to add rigidity to the conveyor system 12. The support rod 29 is fastened to the first and second conveyor rails 23, 25 with fasteners 74 configured to couple to the support rod 29 through apertures 70 formed in the first and second conveyor rails 23, 25. Apertures 35 are also formed in the first and second conveyor rails 23, 25 and are configured to overlie the apertures 70 to allow access to the fasteners 70. As noted above, the first and second conveyor rails 23, 25 are identical and, thus, the conveyor rail 25 includes the same features as the conveyor rail 23.

Figure 4:
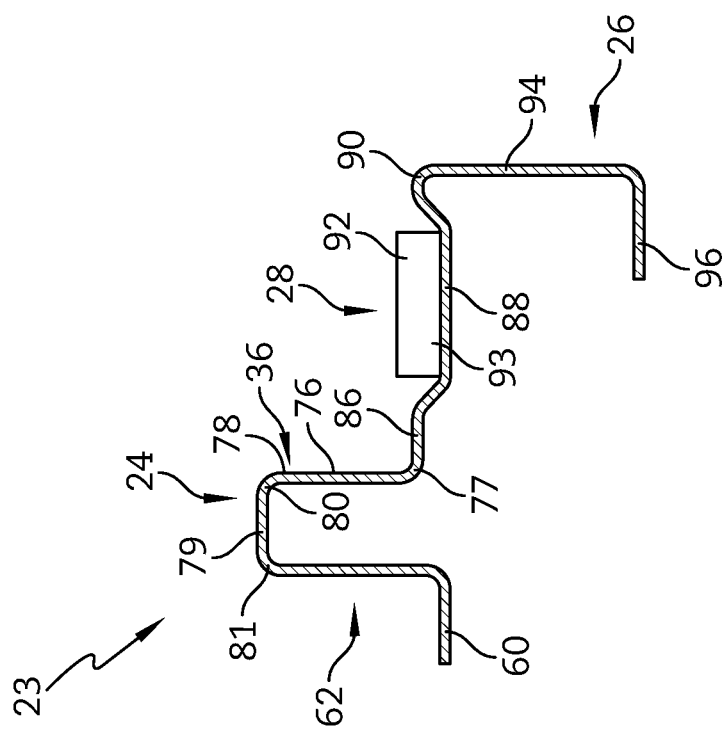
FIG. 4 is a cross section of a conveyor rail of the conveyor system of FIG. 1.

The roller support 24 includes the roller guard 36, a support tab 60, and a roller mount 62, as shown in FIG. 4. The roller guard 36 can be L-shaped and can extend vertically away from the load deck support 28 to couple with the roller mount 62. Illustratively, the roller guard 36 and the roller mount 62 cooperate to form an inverted U-shape. The support tab 60 is coupled to the roller support 24 and extends away horizontally from the roller support 24 to underlie the set of rollers 20. The support tab 60 is configured to cooperate with the support frame 18 to provide additional stiffness to the conveyor rail 23 (and the conveyor rail 25).

The roller mount 62 is formed to include an aperture 64, for example, in the shape of a hexagon, that receives an axel 66 of a roller 68 from the set of rollers 20, as shown in FIG. 2. The roller mount 62 extends longitudinally from the front 19 of the conveyor trailer 10 to the rear 17 of the conveyor trailer 10 and is configured to support the set of rollers 20 so the rollers 68 maintain free rotation when in use. axel of each roller 68 is spring-loaded and the axels 66 extend into apertures 64 in each roller mount 62.

The roller guard 36 can be L-shaped and can extend vertically away from the load deck support 28 to couple with the roller mount 62, as shown in FIGS. 4 and 5. The roller guard 36 includes a first segment 76 and a second segment 79. The first segment 76 couples at a first end 77 to the load deck support 28 and the first segment 76 extends vertically away from the load deck support 28 towards the second segment 79 at a generally perpendicular angle. The second segment 79 couples at a first end 80 to a second end 78 of the first segment 76 at a generally perpendicular angle. The second segment 79 extends horizontally away from the first segment 76 towards the roller mount 62 so that a second end 81 of the second segment 79 couples with the roller mount 62.

The second segment 79 of the roller guard 36 is located between the retainer 70 and a roof 82 of the conveyor trailer 10, as shown in FIGS. 1-3. The arrangement of the first segment 76 and the second segment 79 of the roller guard 36 with the roller mount 62 provides a protective structure over the axels 66 of the rollers 68. Together, the roller guard 36 and the roller mount 62 provide the means for protecting the roller mount 62 from an external force applied to the roller support 24 so that damage to the rollers 68 and the roller mount 62 is minimized during loading or unloading of the conveyor trailer 10.

The first segment 76 of the roller guard 36 is generally parallel with the roller mount 62 and is formed to include a plurality of apertures 84 that are configured to overlie the apertures 64 of the roller mount 62, as shown in FIGS. 2-5. The apertures 84 are sized to allow suitable tools to access the axels 66 of the rollers 20 during maintenance of the set of rollers 20 so that the conveyor rails 23, 25 do not need to be removed from the support frame 18. The first segment 76 couples at a first end 77 to the load deck support 28 to locate the first segment 76 between the load deck support 28 and the roller mount 62.

The load deck support 28 includes a roller guard mount 86, a bumper mount 88, and a frame edge 90, as shown in FIGS. 2 and 4. The bumper mount 88 is arranged to extend between and interconnect the roller guard mount 86 and the frame edge 90, as shown in FIG. 4. The bumper mount 88 is formed to receive a bumper 92 and is configured so that a bottom 93 of the bumper 92 is recessed below the roller guard mount 86 and the frame edge 90. The roller guard mount 86 is configured to extend between and interconnect the roller guard 36 with the bumper mount 88. The frame edge 90 is arranged to extend between and interconnect the bumper mount 88 with the frame mount 26. The load deck support 28 is configured to support the load deck panels 30 when the load deck panels 30 are horizontal. Illustratively, the load deck support 28 can support the load deck panels 30 in the presence or absence of cargo on the load deck panels 30.

The frame mount 26 includes a first segment 94 that is coupled to the frame edge 90 of the load deck support 28 so that the first segment 94 extends vertically downward at a generally perpendicular angle, and a second segment 96 is coupled to the first segment 94, as shown in FIG. 4. The second segment 96 extends at a generally perpendicular angle away from the first segment 94 towards the load deck support 28 so that the second segment 96 is generally parallel with and underlies the load deck support 28. The frame mount 26 is configured to locate a portion of the support frame 18 between the second segment 96 of the frame mount 26 and the load deck support 28. Together, the frame mount 26 and the load deck support 28 cooperate to mount the conveyor rails 23, 25 to the support frame 18. In illustrative embodiments, the second segment 96 is coupled with the a portion of the support frame 18 with a fastener 98.

Figure 12:
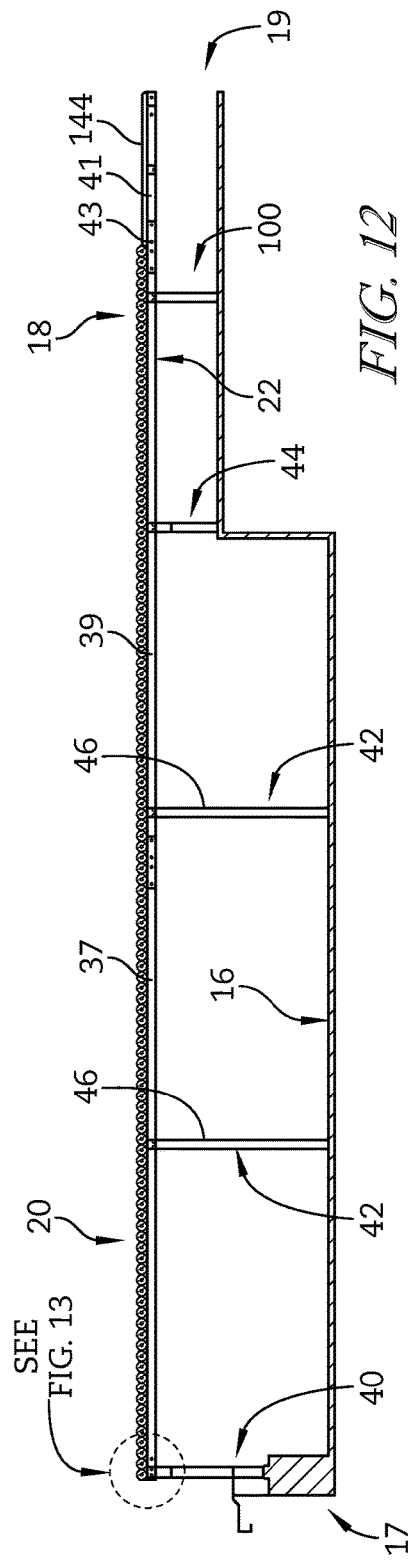
FIG. 12 is a cross-sectional view of the conveyor system of FIG. 1 taken generally along the lines 12-12 of FIG. 11.

In some embodiments, the support frame 18 of the conveyor system 12 can include the rear leg 40, two belly legs 42, an upper coupler leg 44, and a table leg 100 as shown in FIGS. 3, 6, and 12. Illustratively, the rear leg 40, the belly legs 42, the upper coupler leg 44, and the table leg 100 are located in spaced-apart relation along a longitudinal axis of the conveyor trailer 10 to support the conveyor rails 23, 25.

Figure 9:
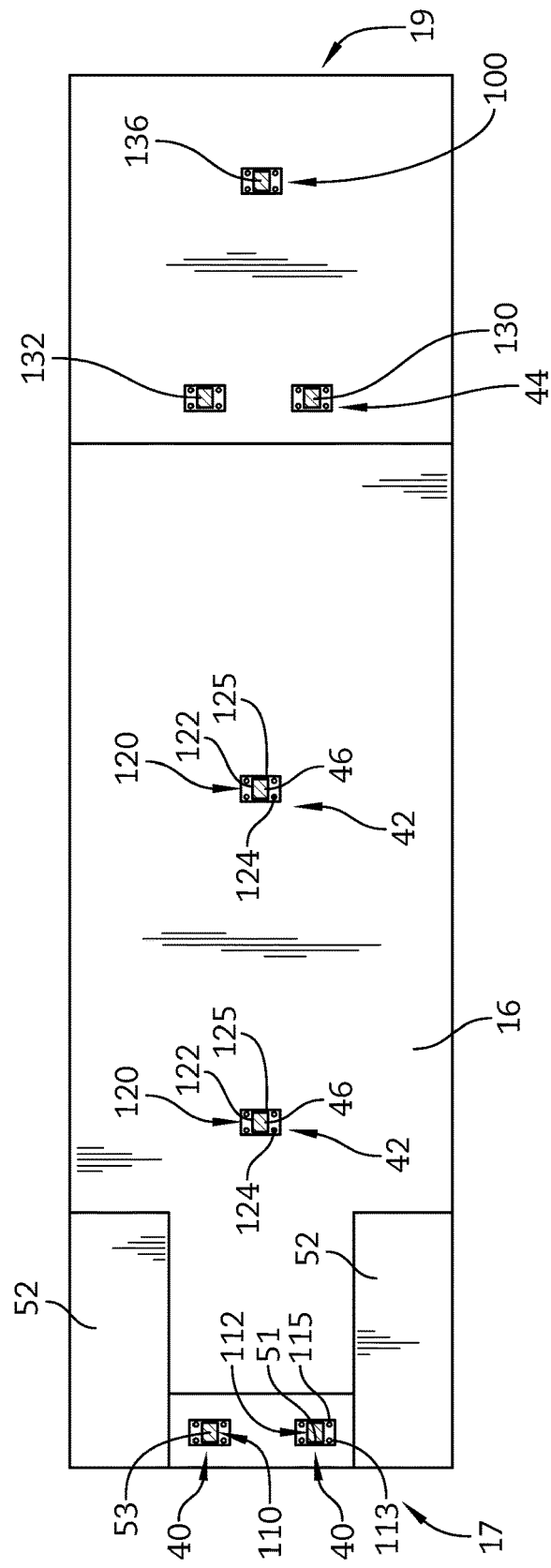
FIG. 9 is a cross-sectional view taken generally along the lines 9-9 of FIG. 6 and depicting a location of various legs of the conveyor system of FIG. 1.
Figure 13:
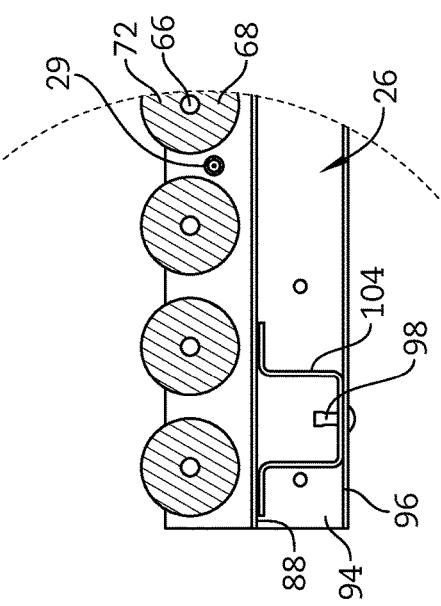
FIG. 13 is a detailed view of a portion of the conveyor system of FIG. 12.

The rear leg 40 is located at the rear 17 of the conveyor trailer 10 between the wheel wells 52, as shown in FIGS. 3, 6, and 9. The rear leg 40 includes a first leg tower 51, a second leg tower 53 located in spaced-apart relation to the first leg tower 51, a rear leg tower brace 102, and a channel support 104. The channel support 104 extends between and interconnects the first leg tower 51 and the second leg tower 53 of the rear leg 40 and is generally perpendicular to the first leg tower 51 and the second leg tower 53. The channel support 104 includes overhangs 106, 107 that are configured to be mount to the second segment 96 of the frame mount 26 with the fastener 98. In illustrative embodiments, the channel support 104 is U-shaped as shown in FIG. 13. In some embodiments, the channel support 104 is coupled to the first leg tower 51 and the second leg tower 53 of the rear leg 40 with a channel support mount bracket 109.

Figure 7:
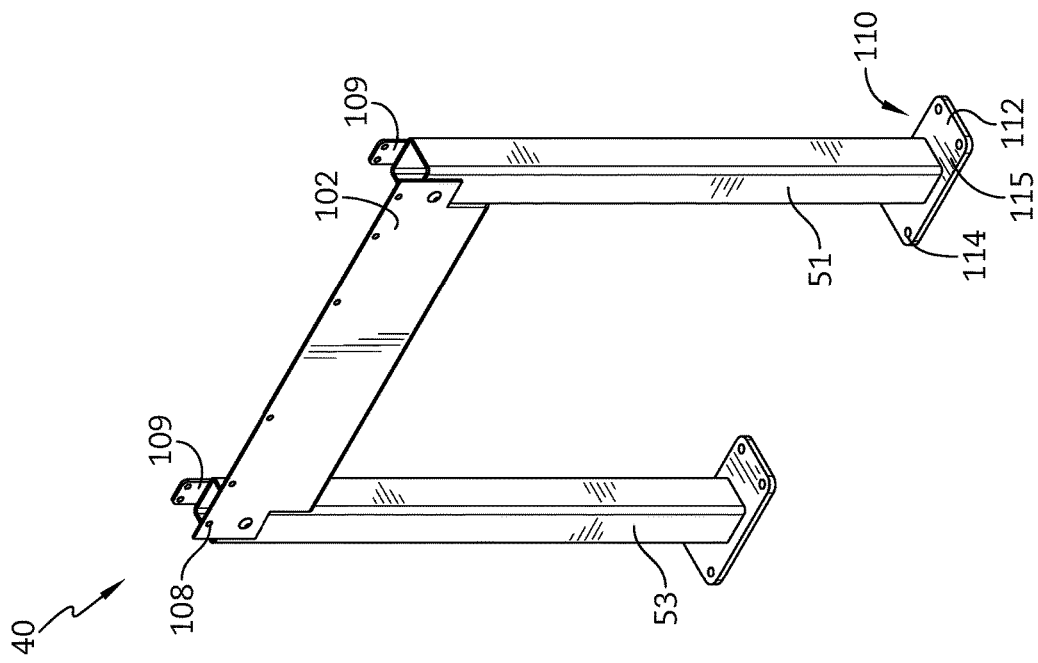
FIG. 7 is a perspective view of a rear leg of the conveyor system of FIG. 1.
Figure 10:
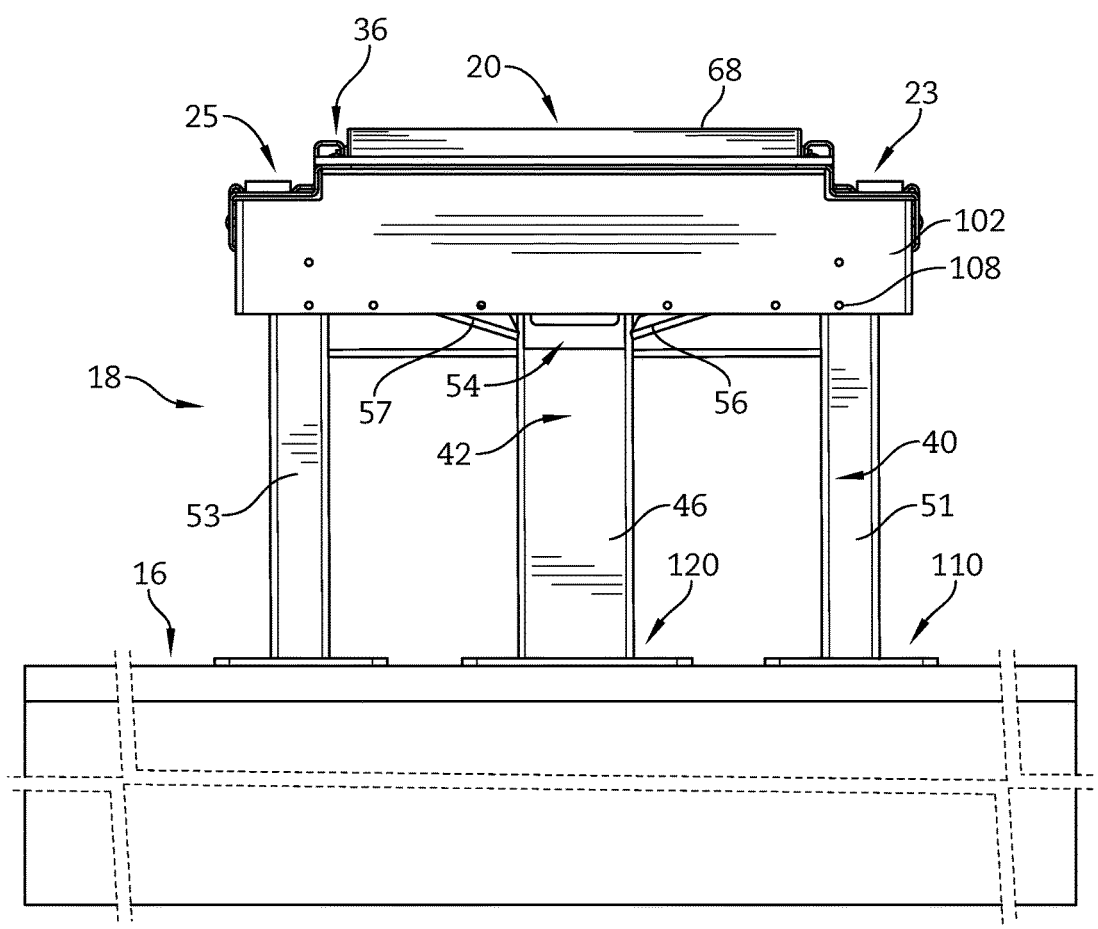
FIG. 10 is a front elevation view showing the rear leg and the belly leg of the conveyor system of FIG. 1.

The rear leg tower brace 102 extends between and interconnects the first leg tower 51 and the second leg tower 53 of the rear leg 40, as shown in FIGS. 6 and 7. Illustratively, the rear leg tower brace 102 extends the entire width of the channel support 104 to overlie the overhangs 106, 107, as shown in FIGS. 3 and 10. The rear leg tower brace 102 can act as a protective web to add stability to the rear leg 40 and to protect the conveyor system 12 from an external force during loading or unloading of the conveyor trailer 10. The rear leg tower brace 102 can be formed to include apertures 108 that are configured to receive a fastener for coupling the rear leg tower brace 102 to the channel support 104 or the two towers 50, or both.

The rear leg 40 is adapted to be coupled to the floor 16 of the conveyor trailer 10 with a floor bracket 110, as shown in FIGS. 3, 9, and 10. The floor bracket 110 includes a frame 112 formed to includes an aperture 113 configured to receive the first leg tower 51 or the second leg tower 53, a flange 115, and an aperture 114 formed in the flange 115. The aperture 114 is configured to receive a fastener therethrough to couple the floor bracket 110 to the floor 16. In an embodiment, the frame 112 is generally square shaped so that aperture 113 is also generally square shaped. Illustratively, the floor bracket 110 includes four apertures 114 configured to fasten the floor bracket 110 to the floor 16.

In illustrative embodiments, the support frame 18 includes two belly legs 42, as shown in FIGS. 3 and 9. In other embodiments, the support frame 18 may include any suitable number of belly legs 42. The belly legs 42 are located in the belly 48 of the conveyor trailer 10 between the rear leg 40 and the upper coupler leg 44, as shown in FIGS. 3 and 9 The belly leg 42 includes a belly tower 46 to maximize the packing space on the floor 16 in the belly 48 of the conveyor trailer 10, as shown in FIG. 8, and a gusset bracket 54 to interconnect the conveyor rails 23, 25 to the support frame 18. The belly legs 42 are located along a longitudinal axis of the conveyor trailer 10 and each are located in about equal spaced-apart relation between the conveyor rails 23, 25.

The gusset bracket 54 of the belly leg 42 includes a first arm 56 and a second arm 57 that extend outwardly from the belly tower 46, and a channel support 58 to couple with the conveyor rails 23, 25, as shown in FIGS. 3 and 8. The channel support 58 is U-shaped and is similar in function to the channel support 104 of the rear leg 40. The channel support 58 extends between and interconnects the first arm 56 and the second arm 57 of the gusset bracket 54 and is generally perpendicular to the belly tower 46. The channel support 58 includes overhangs 116, 117 that are configured to be mounted to the second segment 96 of the frame mount 26 with the fastener 98. In an embodiment, the channel support 58 is coupled to the belly tower 46, the first arm 56, and the second arm 57. Illustratively, the channel support 58 is coupled to the belly tower 46 with a channel support mount bracket 119.

The belly leg 42 is adapted to be coupled to the floor 16 of the conveyor trailer 10 with a floor bracket 120, as shown in FIGS. 3, 8 and 9. The floor bracket 120 includes a frame 122 formed to includes an aperture 123 configured to receive the base of the belly leg tower 46, a flange 125, and an aperture 124 formed in the flange 125. The aperture 124 is configured to receive a fastener therethrough to couple the floor bracket 120 to the floor 16. In an embodiment, the frame 122 is generally square shaped so that aperture 123 is also generally square shaped. Illustratively, the floor bracket 120 includes four apertures 124 configured to fasten the floor bracket 120 to the floor 16.

The gusset bracket 54 includes a first arm 56 and a second arm 57 that extend outwardly from the gusset bracket 54 to support the channel support 58 and to couple with the conveyor rails 23, 25, as shown in FIGS. 3 and 8. Each of the first arm 56 and the second arm 57 is cantilevered from the belly tower 46. The first arm 56 and second arm 57 are arranged to extend in opposite directions so that the first arm 56 couples to the first conveyor rail 23 and the second arm 57 couples to the second conveyor rail 25. Each of the first arm 56 and the second arm 57 include a distal end 126, 127 and a proximal end 128, 129. The proximal end 128 of the first arm 56 is coupled to the belly tower 46 and is arranged to extend horizontally away from the belly tower 46 towards the distal end 127 of the first arm 56. The distal end 127 of the first arm 56 is configured to couple with the first conveyor rail 23. The proximal end 129 of the second arm 57 is coupled to the belly tower 46 and is arranged to extend horizontally away from the belly tower 46 towards the distal end 127 of the second arm 57. The distal end 127 of the second arm 57 is configured to couple with the second conveyor rail 25. Illustratively, the first arm 56 and the second arm 57 are configured to support the channel support 58.

The upper coupler leg 44 is similar to the rear leg 40 and includes a first leg 130, a second leg 132, and a channel support 134, as shown in FIG. 3. As described for rear leg 40, the first leg 130 and the second leg 132 are configured to support the channel support 134 and the conveyor rails 23, 25. As described for the channel support 104, the channel support 134 is configured to mount within the frame mount 26 of the conveyor rails 23, 25.

The table leg 100 is similar to the belly leg 42 and includes a table tower 136, a first arm 138, and a second arm 140, as shown in FIG. 3. As described for the belly leg 42, the table tower 136 is arranged in about equal spaced-apart relation between the first conveyor rail 23 and the second conveyor rail 25. As described for the first arm 56 and the second arm 57, the first arm 138 and the second arm 140 extend outwardly in a cantilevered arrangement from the table tower 136. A channel support 142 is configured to couple with the table tower 136, the first arm 138, and the second arm 140 and span the distance between the first conveyor rail 23 and the second conveyor rail 25.

Figure 11:
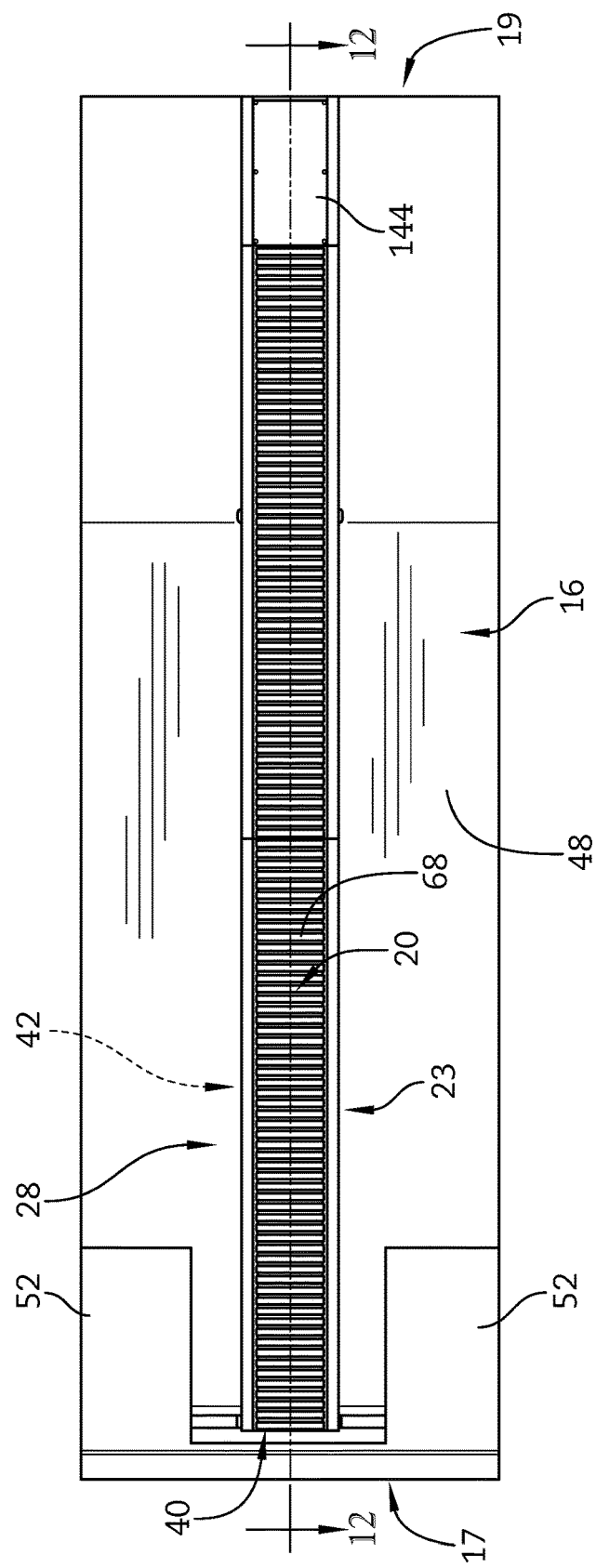
FIG. 11 is a top plan view of the conveyor system of FIG. 1 located within the cargo trailer.

The support frame 18 can further include a table 144 located at the front of the conveyor system 12, as shown in FIGS. 3 and 11. In illustrative embodiments, the table 144 is located above the table leg 100. Illustratively, the table 144 may b monolithic and arranged to extend between and interconnect to the first conveyor rail 23 and the second conveyor rail 25. The table 144 provides a solid surface along a portion of the conveyor system 12 so a user can safely traverse horizontally across the conveyor trailer 10 when the load deck panels 30 are in a horizontal orientation.

The set of rollers 20 includes a plurality of rollers 68 coupled between a first conveyor rail 23 and a second conveyor rail 25, as shown in FIGS. 3, 4, and 11. The plurality of rollers 68 cooperate to efficiently transport cargo within the trailer. In an embodiment the plurality of rollers 68 are comprised of 14 ga. steel. In another embodiment the plurality of rollers 68 are comprised of 16 ga. steel. In still another embodiment, the set of rollers 20 can include steel rollers 68 comprised of 14 ga. and steel rollers 68 comprised of 16 ga. steel. It is understood that while the plurality of rollers 68 are described herein as steel, any suitable metal, metal alloy, or polymeric composition can also be used.

Figure 14:
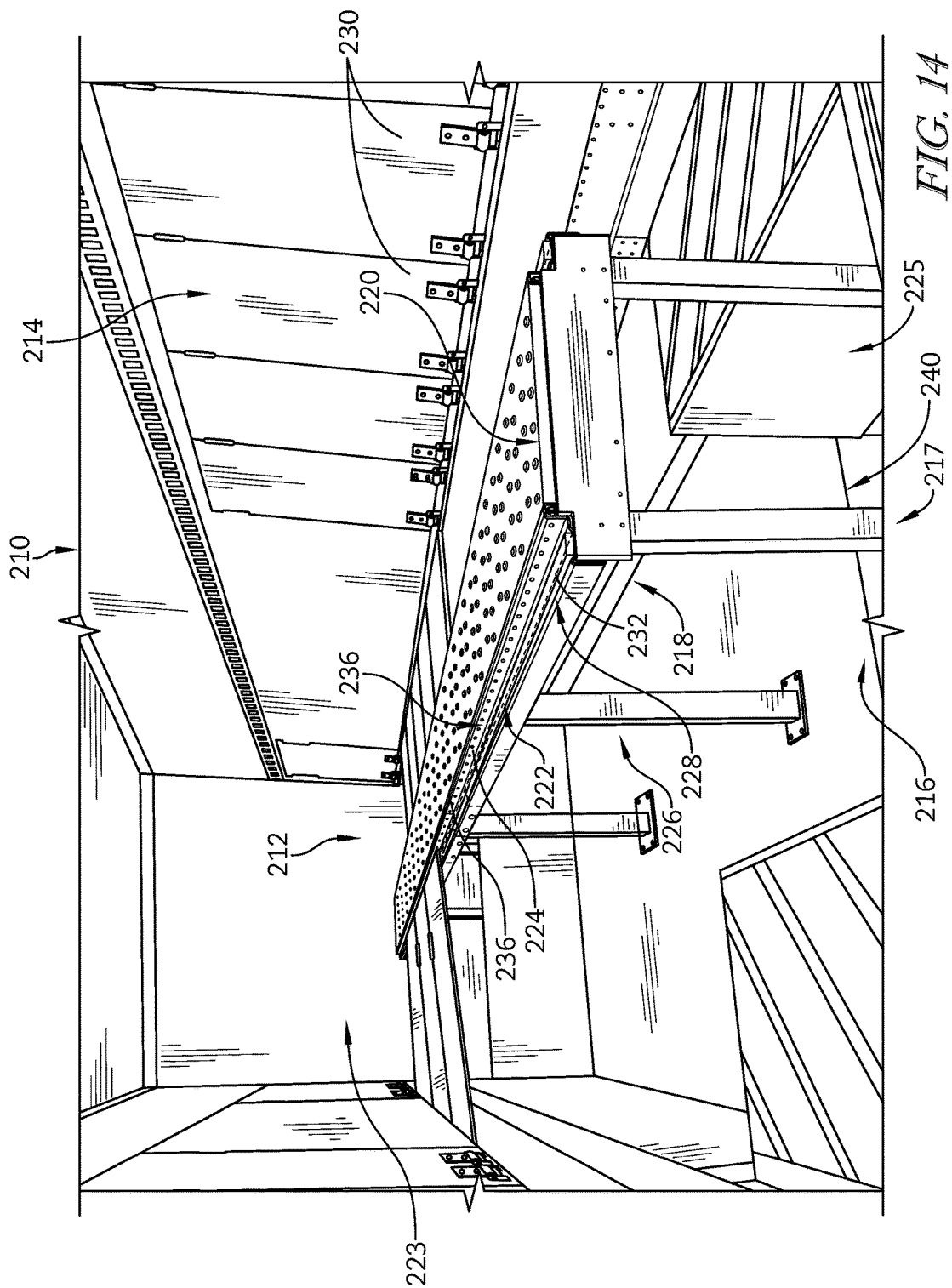
FIG. 14 is a perspective view of another embodiment of a conveyor system for loading a cargo trailer.

According to another aspect of the present disclosure, a conveyor trailer 210 can include the conveyor system 212, a load deck system 214, and a floor 216, as shown in FIG. 14. The support frame 218, the conveyor rail 222, and the load deck system 214 are similar in structure and function to the support frame 18, conveyor rail 22, and load deck system 14 of the conveyor system 12. The conveyor system 212 is mounted to the floor 216 and is used to load and unload the conveyor trailer 210.

The conveyor system 212 includes a support frame 218, a ball transfer assembly 220, and a conveyor rail 222, as shown in FIG. 14. The support frame 218 is adapted to couple the conveyor system 212 to the floor 216 of the conveyor trailer 210, and support the ball transfer assembly 220 and the conveyor rail 222. The ball transfer assembly 220 may improve the efficiency of transporting cargo from the rear 225 of the trailer towards the front 223 of the trailer so the cargo can be quickly secured. Illustratively, the cargo can be secured using the load deck system 214. The conveyor rail 222 extends between and interconnects the ball transfer assembly 220 to the support frame 218, as shown in FIG. 14.

The conveyor rail 222 includes a ball transfer support 224, a frame mount 226, and a load deck support 228 that is arranged to extend between ball transfer support 224 and frame mount 226, as shown in FIG. 14. The frame mount 226 couples the conveyor rail 222 to the support frame 218. The load deck support 228 is configured to receive a bumper 232 and supports the load deck panels 230 when the load deck panels 230 are in the horizontal load position. The ball transfer support 224 couples the ball transfer assembly 220 to the conveyor rail 222 and includes a roller guard 236 that protects the ball transfer assembly 220 from an external force during loading or unloading of the conveyor trailer 210.

The conveyor systems 12, 212 are designed to move cargo in and out of a conveyor trailer 10, 210, sometimes referred to as a semi-trailer. The invention includes a top portion which includes the set of rollers 20 or ball transfer assembly 220, sometimes referred to as conveyance mechanisms (i.e. rollers, balls, frictionless materials, and/or any other suitable conveyance mechanisms), and a support frame 18, 218, sometimes referred to as a bottom portion, which is the support structure to the conveyor system 12, 212. The present invention may streamline the overall design (i.e. fewer parts, less footprint, etc.) and may provide greater overall cargo volume in the conveyor trailer 10, 210, sometimes referred to as trailer. Another potential advantage of the invention is that new conveyance mechanisms allow for multidirectional versus linear flow and are potentially more durable. The conveyor system 12, 212, sometimes referred to as the new design, may eliminate sharp edges and joints which can cause damage to cargo and/or workers. The reduced footprint of the conveyor system 12, 212, sometimes referred to as the new design, allows for better cargo handling/placement ergonomics. The multidirectional flow of the conveyance mechanism would allow cargo to be slid into place versus pick and place.

As noted above, the conveyor trailer 10 may include a load deck system 14 (or 214) attached to the walls 38 of the conveyor trailer 10. The load deck system 14 includes a plurality of load deck panels 30 hingedly attached to the walls 38. The load deck panels 30 may be vertically (or semi-vertically) oriented and may rotate to a horizontal or other angled position to support cargo in the conveyor trailer 10. When the load deck panels 30 are in their horizontal configuration, they extend inwardly from the walls 38 and rest on, for example, the bumper 92 of the load deck support 28 of the conveyor system 12. As seen in FIGS. 15-18, a spring hinge 300 may be utilized to selectively rotate one or more of the load deck panels 30 between the horizontal (or loading) position and the vertical (or storage position). Optionally, the spring hinge 300 may be utilized to rotate the load deck panels 30 from any first position to any second position.

FIGS. 15-18 depict an illustrative embodiment of the spring hinge 300 configured to be coupled to a load deck panel 30 and a wall 38 of the conveyor trailer 10. The spring hinge 300 generally includes a hinge strap portion 304, a hinge butt portion 308, and a torsion spring 312 that may provide hinged movement between the load deck panel 30 and the walls 38. The hinge strap portion 304 may be pivotably coupled to the hinge butt portion 308 via a hinge pin 316 that provides a pivot axis 320. The hinge strap portion 304 includes a hinge plate 324 that extends away from the hinge butt portion 308 and is fixed to one of the load deck panels 30 using one or more fasteners 314 that may be coupled to the load deck panel 30 through one or more apertures (not shown) in the hinge plate 324. Illustratively, the hinge plate 324 may be rectangular in shape and may be rigidly connected to the load deck panel 30. Optionally, the hinge plate 324 may be formed in any suitable shape and/or may be connected to the load deck panel 30 in any suitable manner. The hinge strap portion 304 further includes a cylindrical member 328 coupled to or integral with an end of the hinge plate 324, wherein the cylindrical member 328 includes a channel 330 therethrough. The hinge pin 316 is received in the channel 330 of the cylindrical member 328 and bearings 332 may be positioned at both ends of the cylindrical member 328 between the cylindrical member 328 and vertically extending arms 340 of the hinge butt portion 308.

Referring again to FIGS. 15-18, the hinge butt portion 308 includes a central body 336 that is generally planar and the two vertically extending arms 340 that are coupled to opposing sides of the central body 336. A gap 344 may be formed between the two arms 340 and the central body 336. The gap 344 receives the cylindrical member 328 of the hinge strap portion 304 such that the channel 330 extending through the cylindrical member 328 aligns with apertures 348 in the arms 340. The apertures 348 in the arms 340 are positioned above the central body 336 and receive the hinge pin 316. In this manner, the hinge pin 316 extends through the aperture 348 in one of the arms 340, through a first of the bearings 332, through the cylindrical member 328, through the other of the bearings 332, and through the aperture 348 in the other arm 340.

The hinge butt portion 308 may be connected directly to the wall 38 of the conveyor trailer 10 or to a bracket 355 via one or more rivets 356 that extend through openings (not shown) in the central body 336, wherein the bracket 355 is attached in any suitable manner to the wall 38. It should be understood that other suitable fasteners, for example, mechanical fasteners, adhesives, welds, interference fits, snap fits, etc., may be utilized to couple the hinge butt portion 308 to the bracket 355 and/or any suitable mechanism for attachment of the hinge butt portion 308 to the wall 38 may be utilized. In illustrative embodiments, the wall 38 may include a rail (not shown) that creates an interference fit with the hinge butt portions 308 or the bracket 355. In some embodiments, the hinge butt portions 308 may be attached to the wall 38 in a manner that prevents vertical movement of the hinge butt portions 308, but allows for horizontal or lateral movement of the hinge butt portions 308 (for example, to slide the load deck panels 30 and spring hinges 300 along a length of the wall 38 (i.e., in and out of the conveyor trailer).

Figure 16:
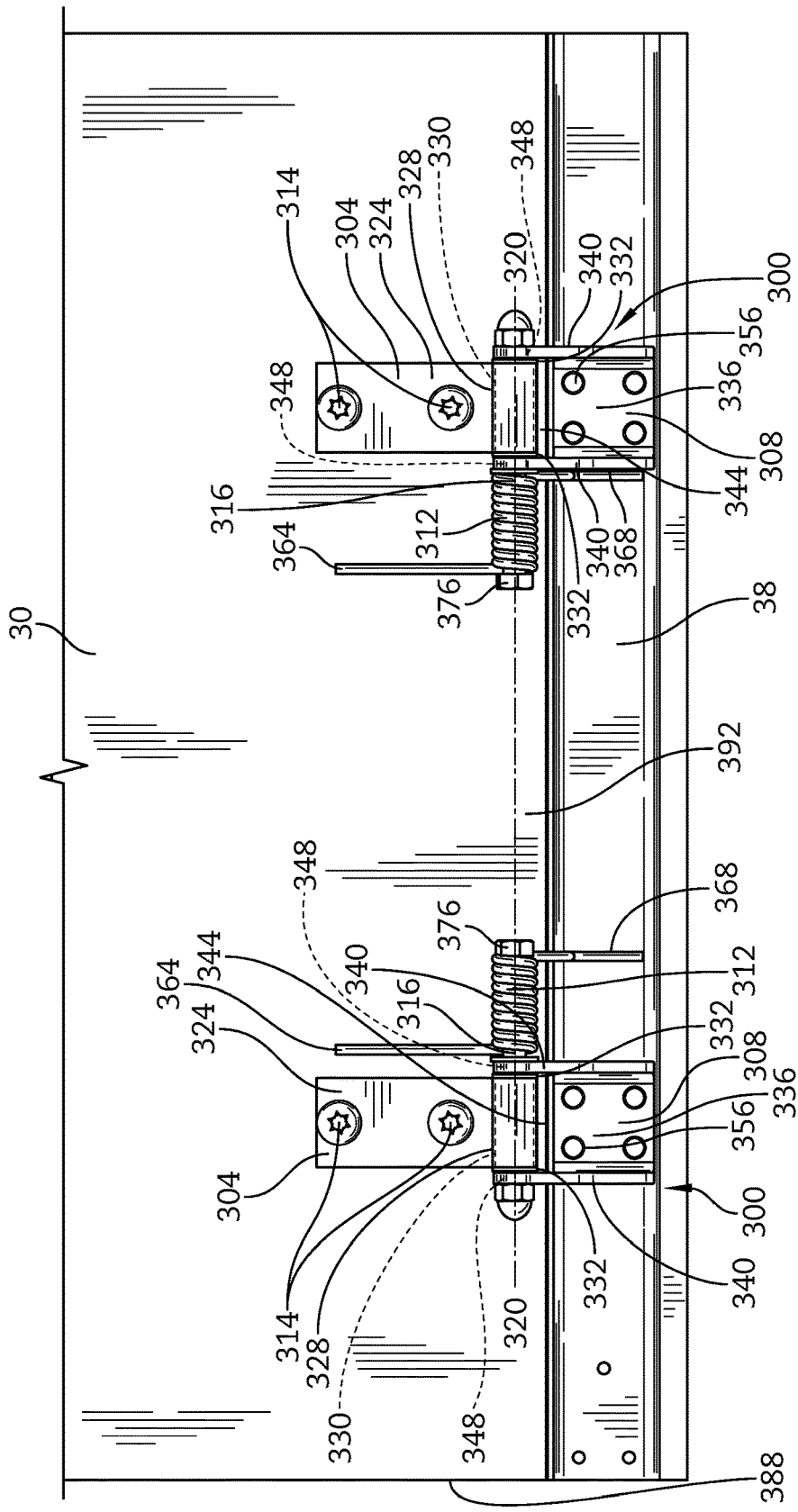
FIG. 16 is a front elevation view of the spring hinge of FIG. 15, wherein only a portion of a load deck panel is illustrated and the load deck panel is depicted in the closed configuration.
Figure 17:
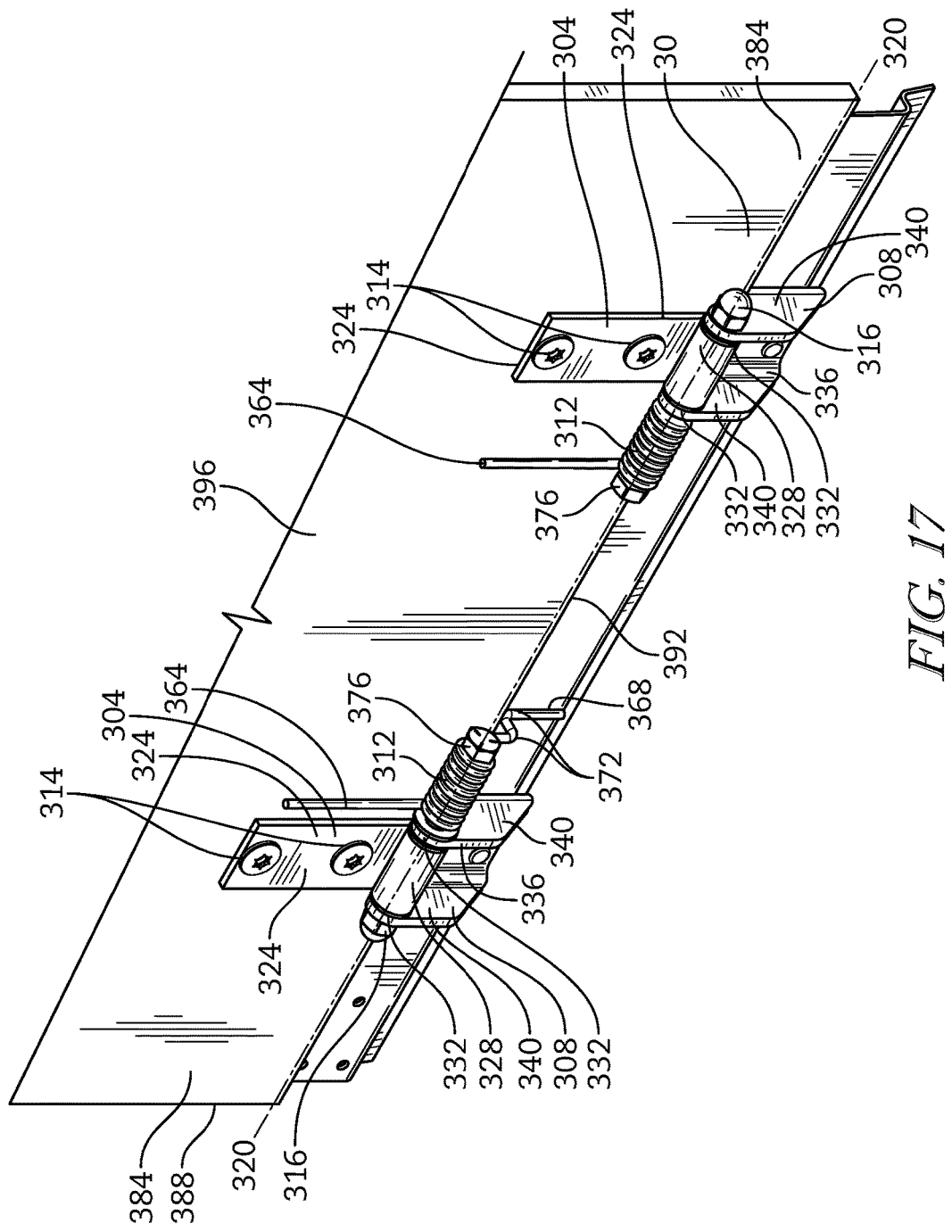
FIG. 17 is a top perspective view of the spring hinge of FIG. 15 with the load deck panel in the closed configuration.
Figure 18:
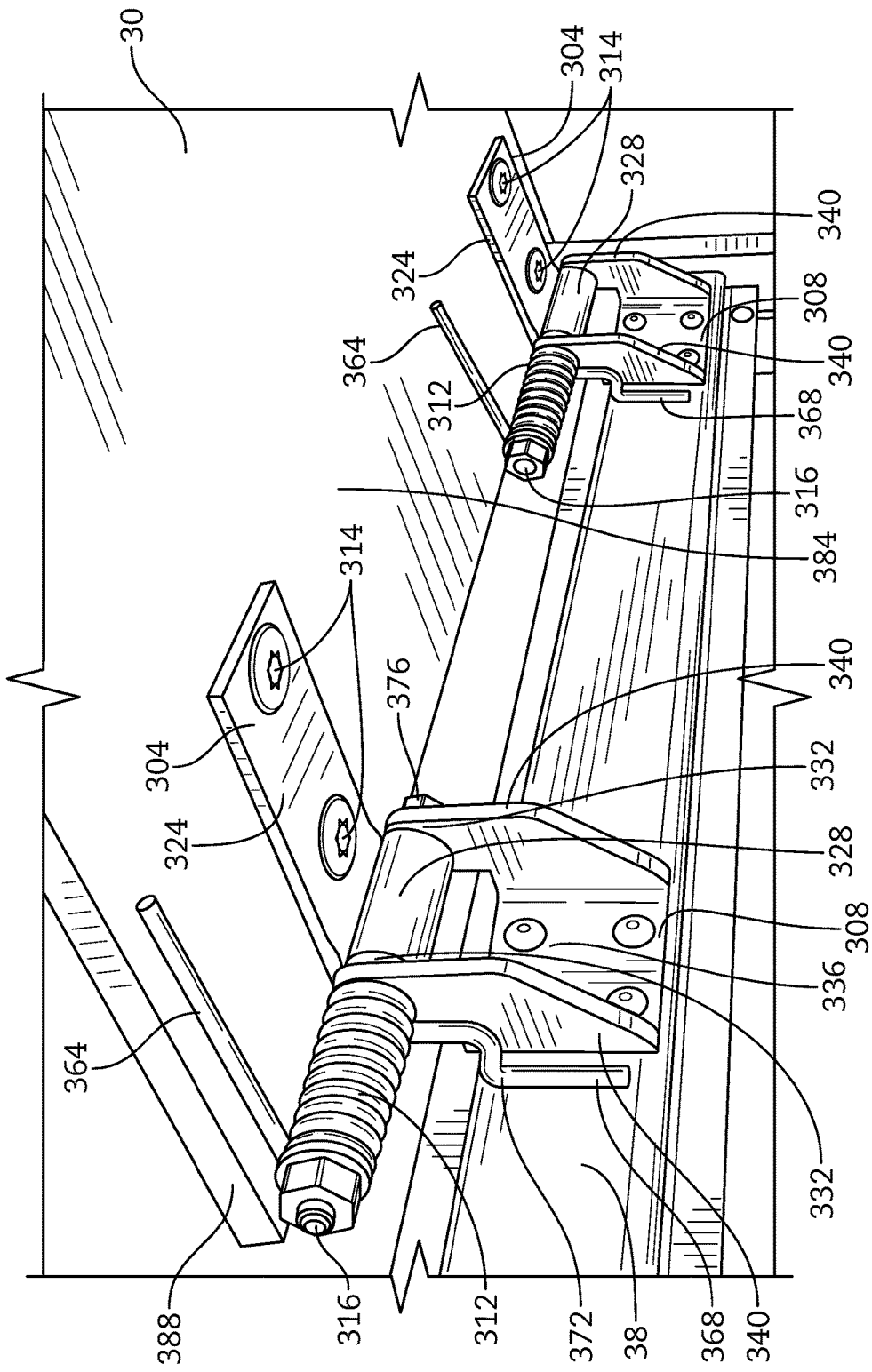
FIG. 18 is a bottom perspective view of the spring hinge of FIG. 15 with the load deck panel in an open configuration (i.e., horizontally oriented).

As seen in FIGS. 16, 17, and 18, the torsion spring 312 is wound around a portion of the hinge pin 316 outside of the gap 344. The torsion spring 312 has a first end 364 and a second end 368. The first end 364 of the torsion spring 312 extends away from the hinge pin 316 into contact the load deck panel 30 and the second end 368 extends away from the hinge pin 316 and makes two L-shaped turns 372 to extend along and into contact one of the walls 38 of the trailer 10. The torsion spring 312 is held in place between an inner surface of an outward protrusion 376 on an end of the hinge pin 316 and one of the arms 340. While the torsion springs 312 are depicted as being inboard of the hinge strap portions 304 and the hinge butt portions 308, one or more of the torsion springs 312 may be located outboard of the hinge strap portions 304 and the hinge butt portions 308.

As again shown in FIGS. 16, 17, and 18, two hinge strap portions 304 are coupled to the load deck panel 30 with fasteners 314 through one or more apertures in the hinge plate 324. It is to be understood that, although two hinge strap portions 304 are shown as being coupled to each load deck panel 30, any suitable number of hinge strap portions 304 may be connected to each load deck panel 30. Illustratively, each load deck panel 30 includes a top surface 380, a bottom surface 384, first and second opposing side edges 388, an outer edge 392, and an inner edge 396. As shown in FIG. 16, each hinge plate 324 is connected to the bottom surface 384 near the outer edge 392 of the load deck panel 30.

Figure 15:
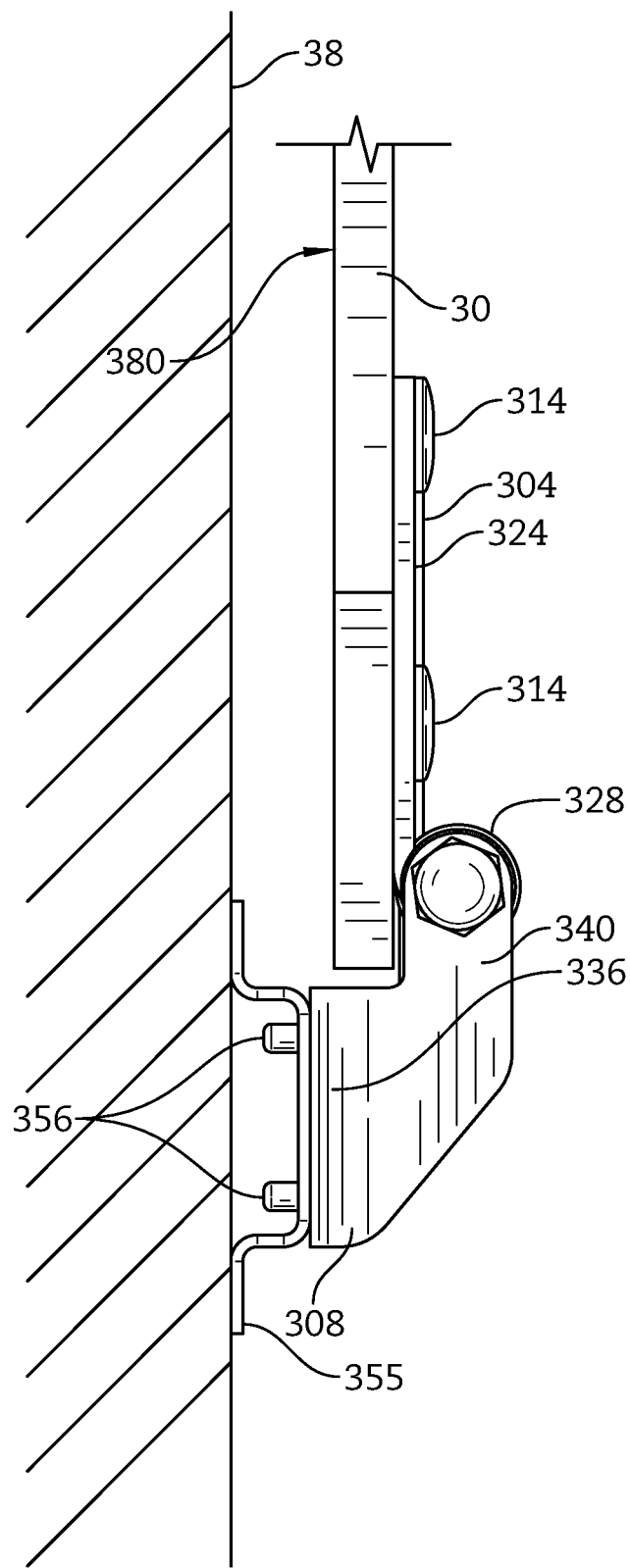
FIG. 15 is a side elevation view of an exemplary spring hinge for use in mounting one or more load deck panels utilized, for example, in any suitable trailer conveyor system, wherein a load deck panel in depicted in a closed configuration (i.e., oriented vertically)

As shown in FIGS. 15-17, the load deck panel 30 is held in the vertical position by contact between the first end 364 of the one or more torsion springs 312 and the bottom surface 384 of the load deck panel 30. A spring constant of the torsion spring 312 generates a torsional force that is translated into a linear force at the first end 364 of the torsion spring 312 against the load deck panel 30. Similarly, the spring constant generates a torsional force that is translated into a linear force at the second end 368 of the torsion spring 312 against the wall 38. The torsional load within the torsion spring 312 and the spring constant of the torsion spring 312 translate the linear force at the first end 364 against the load deck panel 30 and at the second end 368 against the wall 38, which holds the load deck panel 30 vertically against the wall 38.

The spring hinge 300 and the spring constant of the torsion spring 312 selectively allow movement of the load deck panels 30 from the vertical (or storage position) to the horizontal (or loading) position when the torsional force of the torsion spring 312 is overcome. Overcoming the linear force against the load deck panel 30 allows for hinged movement of the load deck panel 30 about the pivot axis 320, pivoting the inner edge 396 towards an inside of the conveyor trailer 10. The load deck panel 30 can pivot about the pivot axis 320 until the load deck panel comes into contact with the conveyor rail 22, defining the horizontal position, as shown in FIG. 18. The spring constant of the torsion spring 312 is selected such that, the load deck panel 30 remains in the horizontal position until rotated into the vertical position by a user. In this manner, the spring hinge 300 provides a lift assist when hinged movement back to the vertical position is desired and allows for an improved mechanism for retaining load deck panels 30 in the vertical position.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A conveyor system for loading a trailer comprising:
a support frame adapted to couple to a floor of a trailer;
a conveyance mechanism coupled to the support frame and configured to extend from a rear of the trailer toward a front of the trailer;
a conveyor rail arranged to extend between and interconnect the support frame and the conveyance mechanism; and
at least one load deck panel configured to be hingedly connected to a wall of the trailer and having a closed position in which a top surface of the load deck panel is adjacent the wall and an open position in which a bottom surface of the load deck panel is adjacent the conveyor rail, the load deck panel including a hinge assembly, the hinge assembly including a hinge butt portion configured to be coupled to the wall of the trailer, a hinge strap portion configured to be coupled to the bottom surface of the load deck panel, a spring extending along a pivot axis and positioned below the bottom surface of the load deck panel, and a hinge pin extending through the spring and coupling the hinge butt portion and the hinge strap portion wherein the spring is configured to assist in hinged movement of the load deck panel about the pivot axis between the open position and the closed position,
wherein the spring is a torsion spring that is wound around a portion of the hinge pin outside of the hinge butt portion,
wherein the bottom surface of the load deck panel is substantially horizontal when disposed in the open position,
wherein the support frame includes a rear leg positioned at a first end of the conveyance mechanism including first and second leg towers spaced from one another and a support member connecting the first and second leg towers, wherein the first and second leg towers are configured to be attached to the floor of the trailer and the support member is coupled to the conveyor rail, and
wherein the support frame further includes at least one belly leg including a single belly leg tower having a first end configured to be attached to the floor of the trailer and a gusset bracket having a channel support connected to a second end of the belly leg tower, wherein the channel support is U-shaped and includes a first overhang and a second overhang, and wherein the gusset bracket and channel support are is-coupled to the conveyor rail.

2. The conveyor system of claim 1, wherein the spring has a first end and a second end, the first end extends away from the hinge pin into contact with the load deck panel, and the second end extends away from the hinge pin into contact with a wall of the trailer and the spring hinge further has a spring constant that selectively allows movement of the load deck panel between the open and closed positions.

3. The conveyor system of claim 1, further including an upper coupler leg spaced from a second end of the conveyance mechanism opposite the first end, the upper coupler leg including first and second legs having first ends configured to be attached to the floor of the trailer and a brace connecting second ends of the first and second legs, wherein the brace is coupled to the conveyor rail.

4. The conveyor system of claim 1, wherein the support frame further includes:
a second belly leg including a single belly leg tower having a first end configured to be attached to the floor of the trailer and a second gusset bracket connected to a second end of the second belly leg, wherein the second gusset bracket is coupled to the conveyor rail.

5. The conveyor system of claim 4, further including an upper coupler leg positioned at a second end of the conveyance mechanism opposite the first end, the upper coupler leg including first and second legs having first ends configured to be attached to the floor of the trailer and a brace connecting second ends of the first and second legs, wherein the brace is coupled to the conveyor rail, wherein a first distance between the rear tower leg and first belly leg, a second distance between the first and second belly legs, and a third distance between the second belly leg and the upper coupler leg are equal.

6. The conveyor system of claim 5, wherein the support frame further includes:
a table leg including a single table leg tower having a first end configured to be attached to the floor of the trailer and a bracket connected to a second end of the table leg tower, wherein the bracket is coupled to the conveyor rail.

7. The conveyor system of claim 6, wherein the table leg is positioned between the second end of the conveyance mechanism and the upper coupler leg.

8. The conveyor system of claim 1, wherein the support member of the rear leg comprises:
a rear leg tower brace extending between and coupled to the first and second leg towers, the rear leg tower brace having a plurality of apertures
a second channel support coupled to the rear leg tower brace, the second channel support extending between and coupling the first and second leg towers of the rear leg to the conveyor rail; and
wherein the second channel support is U-shaped and includes a third overhang and a fourth overhang.

9. A conveyor system for loading a trailer comprising a spring hinge for a load deck panel, the spring hinge comprising:
a hinge butt portion configured to be coupled to a wall of a trailer;
a hinge strap portion configured to be coupled to a bottom surface of the load deck panel,
wherein the bottom surface of the load deck panel is substantially horizontal when disposed in an open position;
a spring extending along a pivot axis and configured to be positioned below a bottom surface of the load deck panel; and
a hinge pin extending through the spring and coupling the hinge butt portion and the hinge strap portion,
wherein the spring is a torsion spring that is wound around a portion of the hinge pin outside of the hinge butt portion, and
wherein the spring is configured to assist in hinged movement of the load deck panel about the pivot axis between a closed position in which the load deck panel is substantially vertical and the open position in which the load deck panel is substantially horizontal.

10. The conveyor system of claim 9, wherein the spring has a first end and a second end, the first end extends away from the hinge pin into contact with the load deck panel, and the second end extends away from the hinge pin into contact with a wall of the trailer.

11. The conveyor system of claim 9, wherein the spring has a spring constant, the spring constant of the spring generates a torsional force that is translated into a linear force at first and second ends of the spring to retain the load deck panel in a vertical position when desired, but also to retain the load deck panel in a horizontal position when desired.

12. A conveyor system for loading a trailer comprising:
a support frame adapted to couple to a floor of a trailer;
a conveyance mechanism coupled to the support frame and configured to extend from a rear of the trailer toward a front of the trailer; and
a conveyor rail arranged to extend between and interconnect the support frame and the conveyance mechanism, wherein the support frame includes a rear leg positioned at a first end of the conveyance mechanism including first and second leg towers spaced from one another and a support member connecting the first and second leg towers, wherein the first and second leg towers are configured to be attached to the floor of the trailer and the support member is coupled to the conveyor rail;
wherein the support frame further includes at least one belly leg including a single belly leg tower having a first end configured to be attached to the floor of the trailer and a gusset bracket having a channel support connected to a second end of the belly leg tower, wherein the channel support is U-shaped and includes a first overhang and a second overhang, and wherein the gusset bracket and channel support are coupled to the conveyor rail.

13. The conveyor system of claim 12, further including an upper coupler leg spaced from a second end of the conveyance mechanism opposite the first end, the upper coupler leg including first and second legs having first ends configured to be attached to the floor of the trailer and a brace connecting second ends of the first and second legs, wherein the brace is coupled to the conveyor rail.

14. The conveyor system of claim 12, wherein the support frame further includes:
a second belly leg including a single belly leg tower having a first end configured to be attached to the floor of the trailer and a bracket connected to a second end of the second belly leg,
wherein the bracket is coupled to the conveyor rail.

15. The conveyor system of claim 14, further including an upper coupler leg positioned at a second end of the conveyance mechanism opposite the first end, the upper coupler leg including first and second legs having first ends configured to be attached to the floor of the trailer and a brace connecting second ends of the first and second legs, wherein the brace is coupled to the conveyor rail, wherein a first distance between the rear tower leg and first belly leg, a second distance between the first and second belly legs, and a third distance between the second belly leg and the upper coupler leg are equal.

16. The conveyor system of claim 15, wherein the support frame further includes:
a table leg including a single table leg tower having a first end configured to be attached to the floor of the trailer and a second bracket connected to a second end of the table leg tower, wherein the second bracket is coupled to the conveyor rail.

17. The conveyor system of claim 16, wherein the table leg is positioned between the second end of the conveyance mechanism and the upper coupler leg.

18. The conveyor system of claim 12, wherein the support member of the rear leg comprises:
a rear leg tower brace extending between and coupled to the first and second leg towers, the rear leg tower brace having a plurality of apertures;
a second channel support coupled to the rear leg tower brace, the second channel support extending between and coupling the first and second leg towers of the rear leg to the conveyor rail; and
wherein the second channel support is U-shaped and includes a third overhang and a fourth overhang.

* * * * *

UNITED STATES PATENT AND TRADEMARK OFFICE
CERTIFICATE OF CORRECTION

PATENT NO. : 10,434,923 B2
APPLICATION NO. : 15/279802
DATED : October 8, 2019
INVENTOR(S) : Leonard W. Baker et al.

It is certified that error appears in the above-identified patent and that said Letters Patent is hereby corrected as shown below:

In the Claims

Column 13, Line 57, Claim 1 "support are is-coupled" should be --support are coupled--.

Signed and Sealed this
Twelfth Day of November, 2019

Andrei Iancu
*Director of the United States Patent and Trademark Office*